United States Patent [19]

Broberg et al.

[11] 4,243,477
[45] Jan. 6, 1981

[54] DEVICE FOR AN INSTALLATION OF A QUARTZ TUBE IN A DEVICE FOR CONCENTRATION OF MINERAL ACIDS

[75] Inventors: Hans Broberg; Lars Dourén, both of Karlskoga, Sweden

[73] Assignee: Aktiebolaget Bofors, Bofors, Sweden

[21] Appl. No.: 41,140

[22] Filed: May 21, 1979

[30] Foreign Application Priority Data

Jun. 21, 1978 [SE] Sweden ............................... 7807069

[51] Int. Cl.³ .............................................. B01D 1/22
[52] U.S. Cl. ........................ 159/13 A; 159/DIG. 15; 422/307
[58] Field of Search ..................... 159/DIG. 15, 13 A; 422/307

[56] References Cited

U.S. PATENT DOCUMENTS

| | | | |
|---|---|---|---|
| 1,935,499 | 11/1933 | Boekel | 422/307 |
| 4,014,735 | 3/1977 | Guth et al. | 159/DIG. 15 |
| 4,138,309 | 2/1979 | Kuhnlein et al. | 159/DIG. 15 |

Primary Examiner—Norman Yudkoff
Attorney, Agent, or Firm—Pollock, Vande Sande & Priddy

[57] ABSTRACT

The evaporating tubes of an acid concentrating system are positioned within a double-walled tube unit which directs heating gases over the tube and are supported at their lower ends on a spherical bearing surface which permits relative movement of the components without inducing unacceptable stress levels.

16 Claims, 15 Drawing Figures

DEVICE FOR AN INSTALLATION OF A QUARTZ TUBE IN A DEVICE FOR CONCENTRATION OF MINERAL ACIDS

BACKGROUND OF THE INVENTION

The present invention relates to an apparatus for installing a long quartz tube in a system for concentration and possible purification of mineral acids, particularly sulphuric acid.

At facilities for concentration of for instance sulphuric acid, there is a desire to be able to achieve such high concentrations as 96% and more. Since sulphuric acid binds water very strongly, a maximum temperature of about 320° C. is required, which because of the great corrosiveness of the sulphuric acid at this temperature makes it necessary to utilize quartz tubes. However, quartz does not have very favourable thermal conductivity and mechanical strength, so that special provisions must be made in the design of the apparatus itself.

SUMMARY OF THE INVENTION

The main purpose of the present invention is to solve the above-mentioned problems. An apparatus for installing quartz tubes is proposed which substantially is characterized in that along substantial portions of its longitudinal extent it comprises a double-walled fire-resistant tube unit in which the quartz tube is arranged with a space between the inner wall of the tube unit and the quartz tube. The space between the walls of the tube unit forms an outer flow channel intended for heating gases and the space between the inner wall of the tube unit and the outer wall of the quartz tube forms an inner flow channel likewise intended for heating gases. These flow channels are connected with each other via holes in said inner wall at the lower parts of the tube unit, the outer flow channel then giving a flow direction for the heating gases which is opposite to the flow direction of the inner flow channel. The quartz tube at its lower end rests with the major portion of its weight against seals via an extensive shoulder surface arranged on the quartz tube. Its upper end is fixed transversally by means of a fastening unit.

This provides for more uniform heating of the parts concerned, so that stresses or bending in the quartz tubes used can be avoided. At such high temperatures, any organic impurities present in conjunction with the concentration process will be destroyed without residue, particularly when an appropriate oxidation agent such as nitric acid is added.

In further developments of the invention, also problems relating to the actual evaporation technique are solved. Further, it is possible to have a device for concentration of for instance sulphuric acid which is flexible as regards the capacity, at the same time as it is favourable from the point of view of operation and environment. Moreover, it will be possible to adapt the facility to different variations of the composition of the acid which is to be concentrated, i.e. it will be easy to use for concentration at both low and high concentrations.

BRIEF DESCRIPTION OF THE DRAWING

An embodiment proposed at present of a device which has the characteristics significant for the invention will be described in the following, with reference to the accompanying drawings, in which.

DESCRIPTION OF THE PREFERRED EMBODIMENTS

The facility described in the following is primarily intended for concentration of sulphuric acid, and is to a certain extent based upon so-called evaporation technique. This involves that sulphuric acid from which nitric acid has been removed is allowed to run along the inside of a quartz tube, which is heated from the outside with heating gases, e.g. combustion gases, from an oil burner. The water content in the sulphuric acid is thereby evaporated. For high concentrations of sulphuric acid, heating temperatures of up to 320° C. are required, which temperatures are sufficiently high so that the organic impurities present will be destroyed without residue, at least when an appropriate oxidation agent (e.g. nitric acid) is added, which involves that the device described also serves as a purification device. The acid concentration device shown is moreover primarily intended for used sulphuric acid from nitration processes and the like, i.e. sulphuric acid contaminated mainly with reasonable quantities of organic substance.

Figure 1:
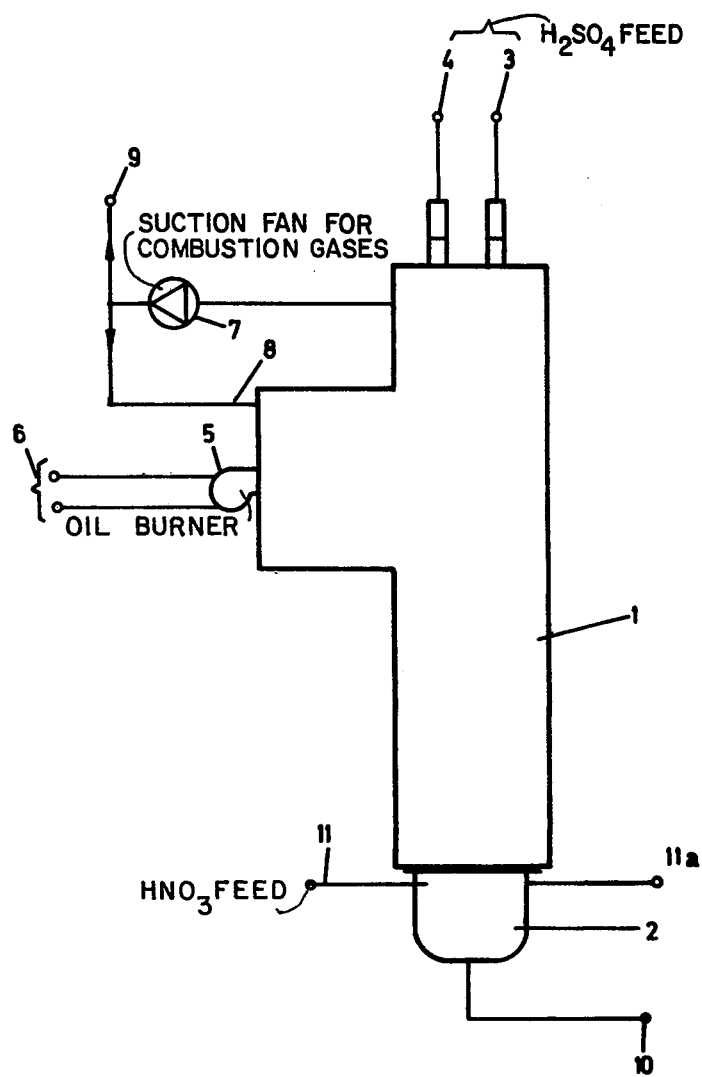
FIG. 1 shows a skeleton diagram of a concentration device which is included in a system for handling residual acid, not shown in detail, FIGS. 2a–2b in vertical sections turned 90° in relation to each other show the embodiment of a design of the concentration device in the system according to FIG. 1, FIG. 3 in a vertical section shows inter alia a quartz tube comprised in the concentration device according to FIGS. 2a–2b, FIG. 4a in a vertical view shows a tube unit for the quartz tube according to FIG. 3, FIGS. 4b–4d in enlargements show various parts of the tube unit according to FIG. 4a, FIG. 5 in a horizontal section shows supporting plates for a number of quartz tubes and tube units according to FIGS. 3 and 4a, taken along line A—A in FIG. 2a, FIGS. 6a–6c in horizontal and vertical sections show a sealing arrangement between an outlet channel and the tube unit according to FIG. 4a, FIGS. 6b and 6c being taken along lines B and C of FIG. 6a, FIGS. 7a–7b in perspective and vertical section show two embodiments of packings utilized in the concentration device, and FIG. 8 in a vertical section shows a modified embodiment of a quartz tube which constitutes an alternative to the use of packings.

In FIG. 1, a concentration device is shown in principle, designated by the numeral 1, and a collecting vessel or container for acid concentrated in the device is designated 2. The acid which is to be concentrated is fed in inlet pipes 3 and 4. The concentration device comprises a furnace that can be heated which generates hot combustion gases by means of an oil burner 5, to which fuel oil and air are conveyed via pipes 6. A suction fan connected to the furnace is designated 7, which fan in the case shown has a capacity of the order of 13000 m³/h. The system has a return pipe 8 for part of said combustion gases, which are returned to the combustion chamber of the furnace in order to make it possible to maintain a constant temperature of said hot combustion gases. Said fan also conveys combustion gases to an air circulator via a connection 9. Said air circulator provides the flow of air for the burner 5. The concentrated sulphuric acid is conveyed off from the vessel 2 via an outlet pipe 10. Cold HNO₃ is fed via a pipe 11. A balance pipe is designated 11a.

In accordance with inter alia FIGS. 2a and 2b, the device 1 comprises a number of long quartz evaporating tubes 12 (cf. also FIG. 3) which respectively are arranged in a tube unit 13 (cf. also FIG. 4a) in the way described in more detail in the following. In the example of the embodiment, the quartz tubes have a length of approx. 5 meters, but can in principle vary between for instance 3 and 10 meters. Further, the inner diameter is approx. 125 mm, and appropriate variations for this inner diameter are for instance between 100 and 200 mm. The quartz tubes are made of a quality (e.g. clear quartz) which has comparatively good heat conducting capability and strength. The tubes have a thickness of material of 4–12 mm and a weight of for instance 6–7 kg.

Said tube unit 13 is made of fire-resistant steel material. As will be noted from FIG. 4, the tube unit has double walls along substantial parts of its longitudinal extent. By a double-walled tube unit is meant in the present case the embodiment according to which the tube unit in principle consists of two tubes 13a and 13b which are separate from each other, and which are supported individually. However, the designation double-walled also includes the case when the two coaxially arranged tubes are connected to each other. The tube unit in question is somewhat shorter than its associated quartz tube, and in the present case has a length of approx. 4.2 meters, the tube unit then being double-walled from its lower parts up to 25–70% of its height. A space formed between the walls is designated 13c.

Figure 2A:
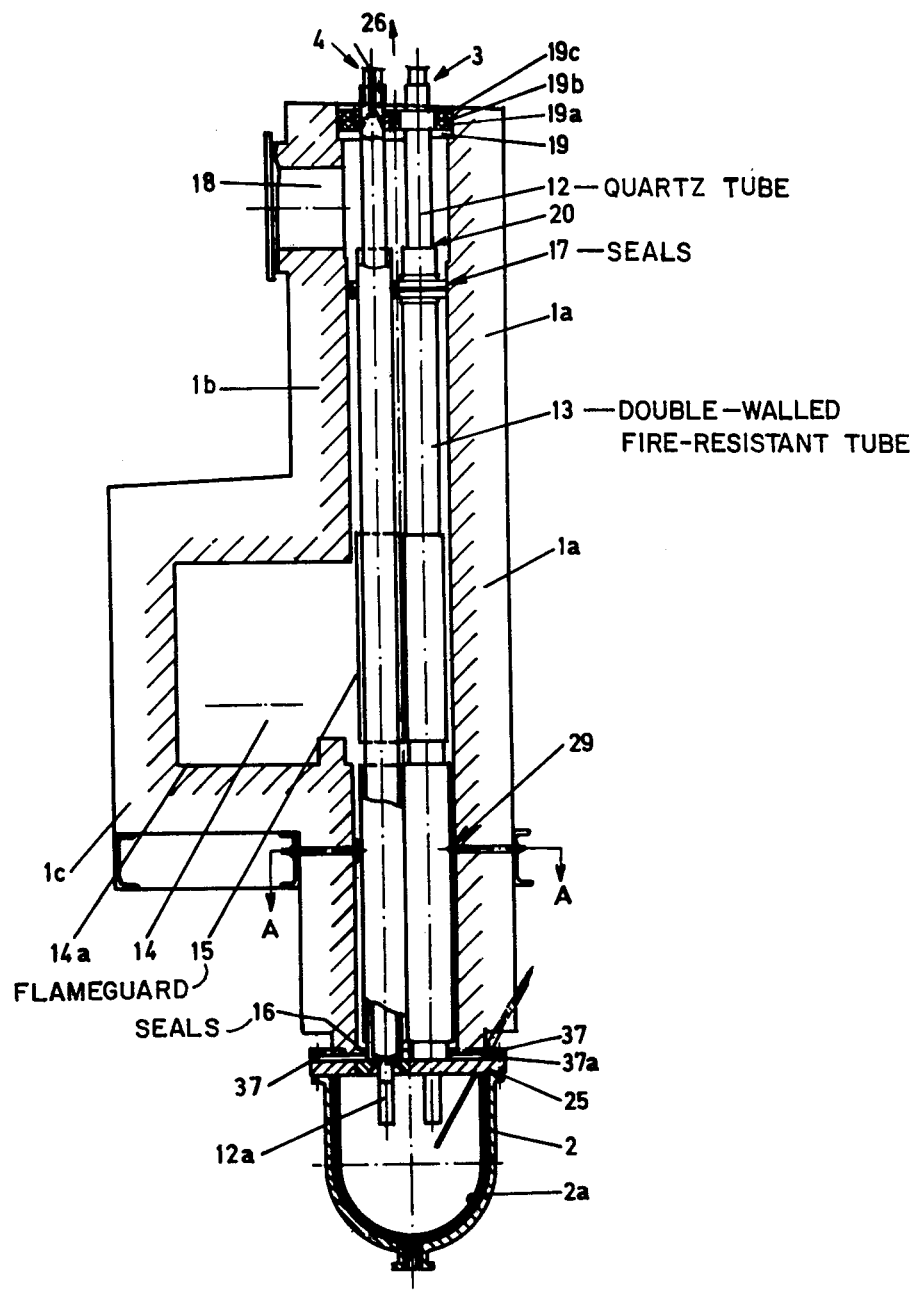
Figure 2B:
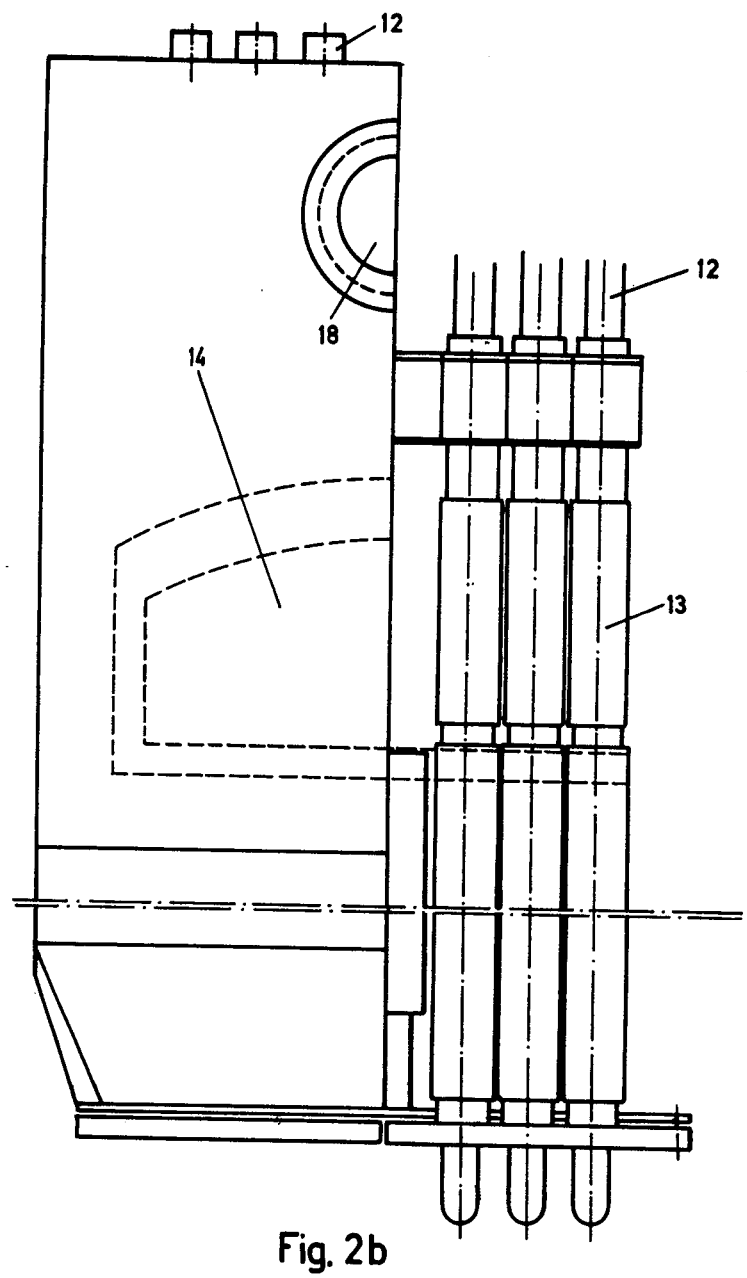

If FIGS. 2a and 2b are regarded again, it will be noted that the furnace comprises a combustion chamber 14, in which the oil injected is mixed with air and combusted. Said returned heating gases are directed into the furnace so that they will come in front of the flame. The quartz tubes and tube units extend with sections past said combustion chamber, and the tube units 13 have flame guards 15 on the outside. At the lower parts, the quartz tubes extend sealed through the lower part of the furnace and down into the vessel or container 2. The seals, which are symbolized by inter alia 16 will be described in more detail in the following. The tube units 13 are substantially fixed inside the furnace. At their upper ends, both the quartz tubes and the their respective tube units extend through further seals symbolized by 17 and described in the following, which separate the combustion chamber 14 of the furnace from an outlet channel 18, which is connected to the above-mentioned combustion gas fan 7 (FIG. 1). The quartz tubes 12 also extend entirely through said outlet channel 18 and up and through a fastening unit 19, which primarily holds the quartz tubes fixed transversally, but also achieves a seal between the combustion gas outlet 18 and the atmosphere. Further, in the case shown, the tube units are supported at 29 by means of supporting plates described in the following which coact with the outsides of the outer walls of the tube units. In certain embodiments, however, it is appropriate to eliminate said supporting plates entirely.

The double wall of the tube unit 13 extends substantially to a level with the bottom plane 14a of the combustion chamber, which involves that the space 13c between the double walls will be in direct connection with the combustion chamber. As will be noted from FIG. 2a, the quartz tube 12 is arranged in its tube unit with play, which is designated 20 in FIG. 2a, in relation to the inner wall of the tube unit. The space between said inner wall (13b in FIG. 4b) and the outside of the quartz tube is connected in flow-through relationship with the space 13c between the double walls of the supporting tube at the lower parts of the quartz tubes and the tube unit via connection holes made in the inner wall of the tube unit. Said connection holes are designated 21 in FIGS. 4a and 4d. There are 8 layers of holes, with 12 holes per layer.

Through the arrangement shown with quartz tubes and the tube unit, the space 13c between the walls of the tube unit can serve as an outer flow channel for said combustion gases and the space between the quartz tube and the inner wall of the tube unit as an inner flow channel for the same combustion gases, which outer and inner flow channels are connected via said connection holes 21. The outer and inner flow channels are parallel to and encircle the quartz tube. As the inner flow channel emerges in the outlet channel 18 said combustion gas suction fan 7 will achieve convection in the heating gases which have been heated in the combustion chamber which by the suction are forced down into the outer flow channel, via the connection holes 21 and into and up in the inner flow channel and from there on out into the outlet channel 18. Through the counter-current convection obtained in the first and second flow channels, it will be possible for heat conduction to take place to the inner of the quartz tube, through said convection, and also through direct heat radiation from the heated parts of the supporting tube. The fan and the flow channels are adapted so that a speed of the combustion gases of 20–50 meters per second is obtained. The gas flow is cooled down successively during its passage through said flow channels and the heat conduction to the quartz tube through convection decreases successively. However, there is also the radiation heat. Through its radiation, the outer wall of the tube unit emits heat to the inner wall of the tube unit, and this, in turn, emits radiation heat to the quartz tube. The sum of the convection heat and the radiation heat will be more or less constant along a large portion of the length of the quartz tube, and in this way very uniform heating is obtained.

Also the heating of the substantially firmly fastened tube unit takes place uniformly, which involves that the walls of the tube unit will not bend and in this way affect the quartz tube inside, which is sensitive to mechanical stresses.

The quartz tube is centered in the tube unit at said seals 16, and also at the fastening unit 19. The tube rests with the major portion of its weight against a seat extending out and arranged in connection with the seal, so that a certain ball-bearing function is obtained in the support in question. See FIG. 3.

Figure 4B:
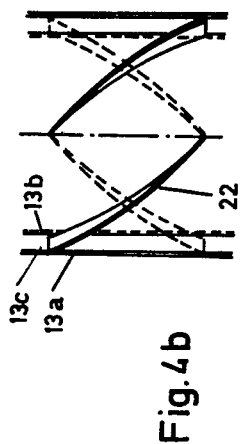
Figure 4C:
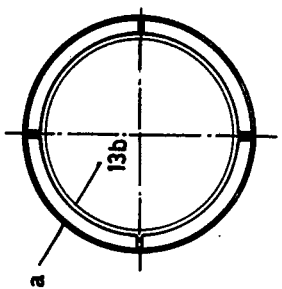
Figure 4D:
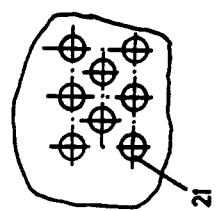
Figure 4A:
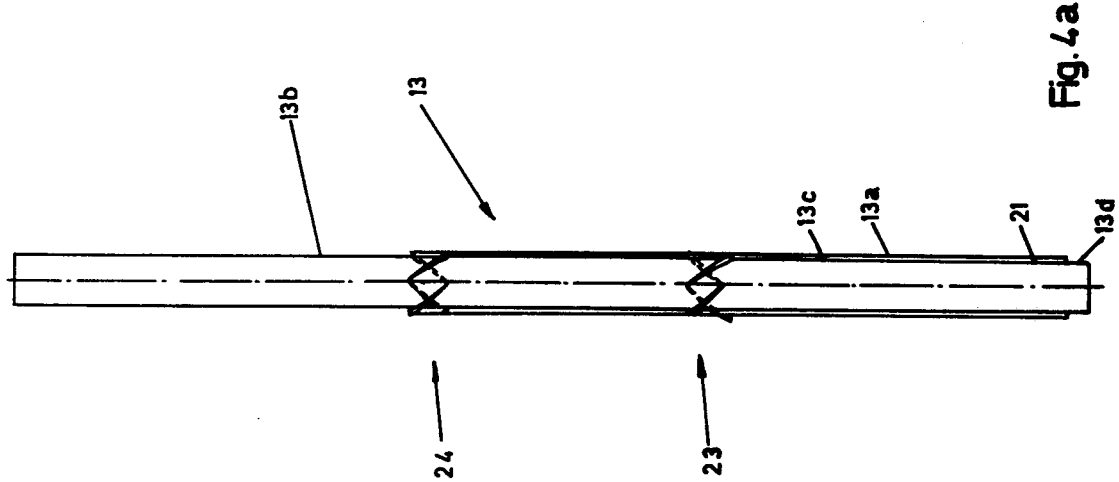

In order to achieve further improved distribution of the heat and heat conductivity at the quartz tubes and the tube units, as shown in FIGS. 4a–4c guide vanes 22 are arranged across the space 13c or the outer flow channel so that a vigorous turbulation of the heating gases is obtained in said outer flow channel. In the example of the embodiment shown, said guide vanes 22 are arranged at two different levels 23 and 24 on the tube unit. At each level, four guide vanes coact in the turbulation function, and each guide vane is then somewhat curved in its own plane and extends approx. 45° from a cross-section plane through the supporting tube at the end in question of the guide vane. Each guide vane covers one fourth of the circumference of the space and is fastened along one of its longitudinal sides to the inside of the wall 13a. The guide vane does not extend entirely over the whole of the space 13c, but only between 80–95% of this. To a certain extent, the guide vanes will serve as bracing elements for the walls in the tube unit.

Each tube unit is held via its inner wall via a protruding part 13d of the inner wall at the lower part of the tube unit in a fire-resistant cast iron plate 25, which is shown in FIG. 2a.

The inlets 3 and 4 for the acid which has been fed in comprise spreading devices 26 which spray the acid against the inner wall of the quartz tube in question, so that it runs downwards along the inner wall.

Figure 3:
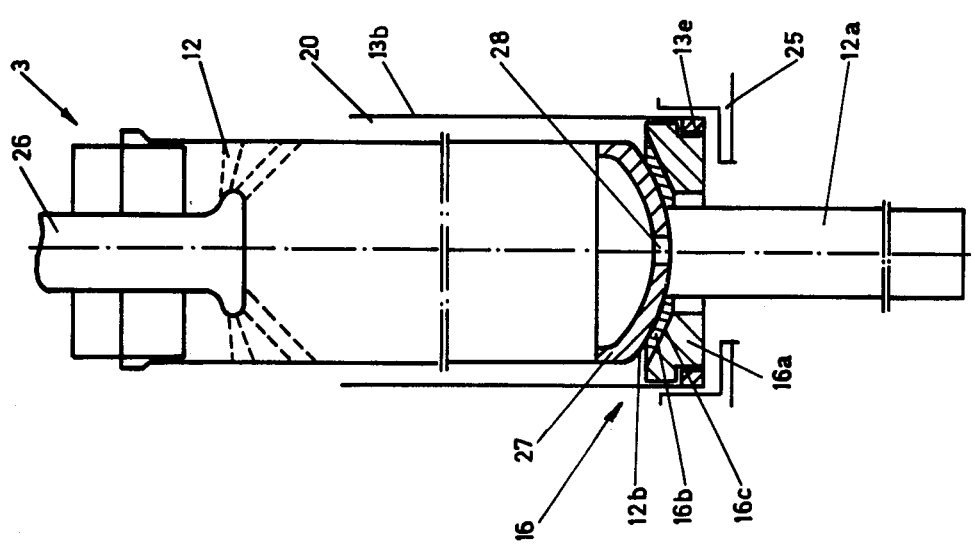

As shown in FIG. 3, the seals 16 comprise a first sealing ring 16a made of quartz or the like. Said first sealing ring rests against a flange 13e extending inwards on the tube unit 13. On top of the first sealing ring a second sealing ring 16b of quartz fibre or the like is arranged, which is contact with the first sealing ring via an oblique surface 16c. At the bottom, the quartz tube has a considerably tapered part or reduced diameter portion 12a extending from the center of a wide spherical segment formed shoulder 12b. At said tapered part, inside the quartz tube, a bowl shaped reinforcing element 27 is arranged, which is fastened in the inner wall of the quartz tube. Said reinforcing element comprises a central outlet hole 28, which leads down into said tapered part.

Said tapered part 12a extends down into the collecting vessel to between 30 and 60% of the height of this, appropriately 40%, the height of the vessel then being between 10 and 20%, preferably 15%, of the length of the quartz tube.

Figure 5:
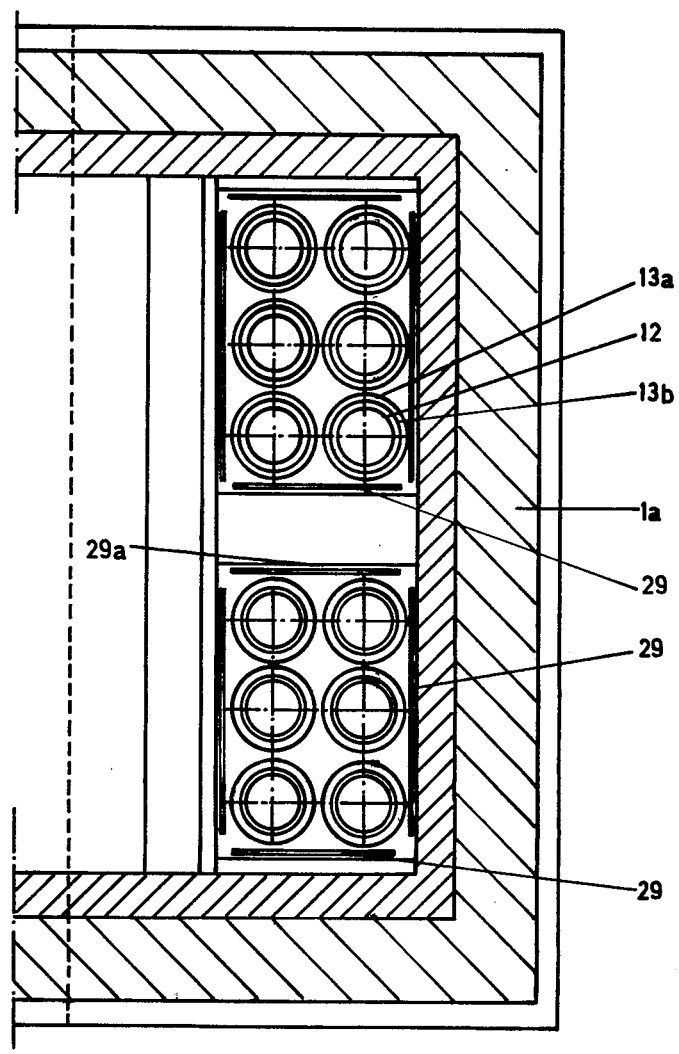

FIG. 2a shows the boundary walls of the furnace, designated 1a, 1b and 1c. FIG. 5 is intended to show the quartz tubes used in certain embodiments with their tube units in the supporting plates 29 bracing the respective modular unit, There are four plates 29 for each modular unit which enclose the tubes comprised in the modular unit in a rectangle. Supporting plates 29 coact with the outsides of the tube units, which are moreover in contact with each other so that a tube package is formed. When two separate tubes are used in the double walled tube unit, the outer tubes or the outer walls 13a can be fastened by means of screws 29a in said supporting plates.

Figure 6:
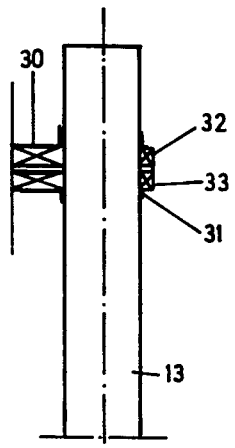
Figure 6C:
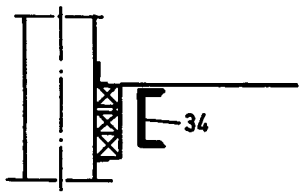
Figure 6A:
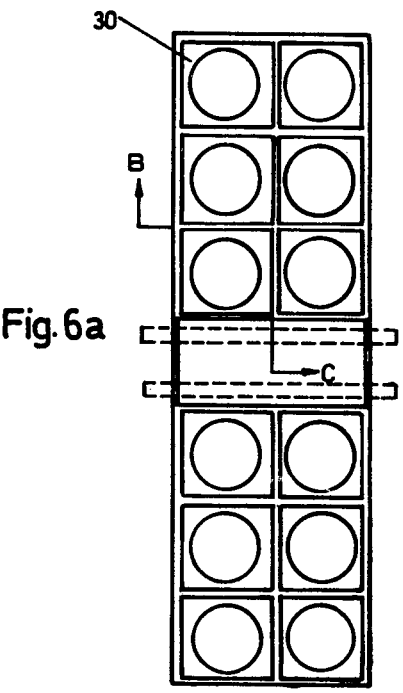

FIGS. 6a–6c are intended to show the seals 17 according to FIG. 2b in detail. The seals are inserted between two plates 30 and 31, of heat-resisting material, and provided with recesses. The actual heat seal comprises a ceramic felt 32, under which is applied a sealing plate 33 (Trito Board). The seals are supported by two beams 34 arranged over the space in question in the furnace. It is essential for the seals in question that they support the tube units laterally, at the same time as they permit at least a certain longitudinal displacement of the tube units in their longitudinal directions.

As regards the seals at the upper and lower parts of the furnace, these can consist of plates 19 and 25, respectively, appropriately of cast iron, in which such holes have been made that the respective quartz tube can be displaced axially in these holes. On top of e.g. the plate 19 a porous acid-resistant material, e.g. quartz wool 19a can be applied. On top of this porous acid-resistant material a further acid-resistant material can be arranged, which can give tight layers 19b, 19c, and for instance consist of ceramic felt, quartz sand with an appropriate grain distribution, board, etc. On top of the cast iron plate 25 a flanged plate 37 is applied, which is in contact with the plate 25 via insulating material. The vessel is sealed against the underside of the plate 25 in the corresponding way. The parts 25, 37 and 2 are held together by means of bolts.

In order to further increase the heat transmission to the acid fed to the quartz tube, in a first example of an embodiment the use of packings which are known in themselves and which are applied inside the quartz tubes is proposed. Said packings give a larger total area and, accordingly, better rectification. The temperature at the top of the tube units can thereby be kept lower, which is of importance for the durability of the seals used at the top of the furnace.

With small packings, however, the risk for flooding of the liquid which runs down in the tube is increased, as in this case the liquid can be carried along and be dammed up by the gas flow directed upwards which occurs. This can be followed by a wave of liquid, resulting in irregular boiling. However, a prerequisite for flooding is a high gas speed. The gas speed is nearly zero at the bottom of the respective quartz tube, and increases in relation to the heat conducted to a maximum at the top of the quartz tube.

With the ratios prevailing between liquid and gas at the top of the tube unit, the flow speed, i.e. the gas speed at which flooding can take place, with 25 mm packings is 2.5–3.0 m/sec., with 40 mm packings 3–4 m/sec., and with 50 mm packings 4–5 m/sec.

In the present case, the gas speed is calculated to be approx. 2.5 m/sec. at the top of the tube unit. At total evaporation of the liquid fed in, however, the gas speed may increase to twice this speed. However, total evaporation takes place only in exceptional cases.

In case packings are to be placed in the entire quartz tube in the case mentioned above, the packings at the top should not have a diameter of less than 40 mm. Up to half of the height of the quartz tubes, packings with a diameter of 25 mm can be used.

In certain embodiments it is also possible to limit the height of the packing layer, so that at the top of the packing layer a maximum gas speed of 1.5 to 2.0 m/sec. will be obtained. The liquid is then sprayed against the walls of the quartz tube with the aid of the spreading device 26 in the top of the quartz tube. Water is removed from the liquid which runs along the walls. When the liquid comes into contact with the layer of packings, the gas speed is adapted to 1.5–2.0 m/sec. so that the liquid is partly spread out over the layer of packings, i.e. the gas speed is adapted so that good spreading, but no flooding, takes place.

Figure 7A:
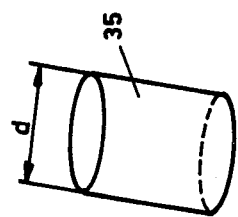
Figure 7B:

FIGS. 7a and 7b show examples of shapes of two different embodiments of packings, 35 and 36.

The packings consist of pieces of quartz tubes, for instance pieces of clear quartz tubes, which in the following will be specified in three different dimensions, small dimensions, medium dimensions and large dimensions. By small dimensions of the packings is meant those which have a greatest extent of between one twentieth and one eighth, preferably one tenth of the inner diameter of the quartz tube in question. Medium sized packings are the pieces of quartz tube which have a maximum extent of between one eighth and one fifth, preferably one sixth, of the inner diameter of the quartz tube in question. By large packings is meant the pieces of quartz tube which have a maximum extent of between the fourth and one half, preferably one third, of the inner diameter of the long quartz tubes. Said pieces of quartz tube have substantially the same diameter and length, and can have the form shown by 35 in FIG. 7a.

According to the embodiment shown in FIG. 7b, the packing consists of a hemispheric body, appropriately of quartz, in which holes have been made in or in the vicinity of the top of the dome, and which hemispheric body is placed with the large open part at least substantially downwards in the quartz tube. When a plurality of such hemispheric bodies is used, there are placed at a distance of from 100 to 500 mm, preferably approx. 250 mm, from each other.

Figure 8:
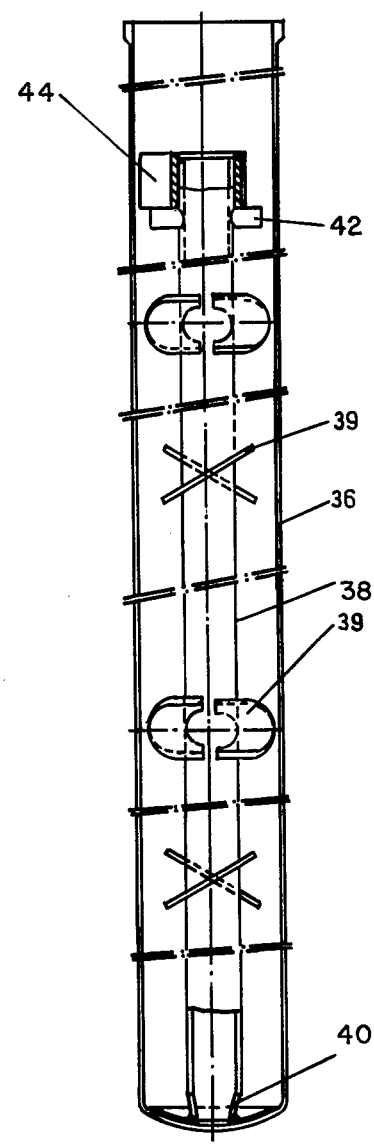

At the concentration of sulphuric acid which contains certain metal salts, in the example with packings, these can become coated, which involves that the packings may be burned together and/or to the quartz tube. In cases when this problem is present, as an alternative to packings, a quartz tube which is known in itself according to FIG. 8 can be used. In principle, said quartz tube consists of an outer tube 36 and an inner tube 38, and the spaces in the tubes are connected to each other via connection holes 40. On the inner tube, at different height levels, plates are arranged obliquely, which give the gases rising in the quartz tube rotating movements. The gas flow upwards will carry along drops of liquid, and will keep the inner wall of the quartz tube (the inner wall of the outer tube) uniformly moistened. The function will be dependent on the rotating speed, which can be adapted through a choice of dimensions of the inner tube and the angle of pitch, which is the angle which the obliquely set means has in relation to a cross section plane through the quartz tube. With a pitch angle of e.g. 30 degrees and with a 50 mm inner tube, the vertical gas speed in the present case (quartz tube 140×4; evaporated quantity of water 64 kg/h; 250° C.) at a height level of 1 meter of the tube, will be approx. 0.8 m/sec. The curve in question is straight up to a height level of 3 m, where the gas speed is approx. 2.5 m/sec. The curve is broken at the last-mentioned value, and at a height level of 5 m, the gas speed is approx. 3.6 m/sec. At its upper parts, the inner tube is also provided with lifting lugs 42 and a supporting sleeve 44.

The device for concentration of for instance sulphuric acid is arranged in such a way that it is a simple matter to choose the quartz tubes, i.e. quartz tubes for packings or quartz tubes for internal rotation of rising gases.

In the furnace which can be heated and the collecting vessel connected to it for concentrated acid, on one side the space which is intended for the heating means (the combustion gases) and on the other side the spaces over and/or under the respective seals are connected to pressure regulating equipment not specially shown which achieves that the pressure in the space for the combustion gas used for the heating is somewhat higher than the pressure in the other space or spaces. The pressure regulation in question can be achieved through a setting of the outlet of combustion gases from the system, and also through a setting of the sucking off from the collecting vessel 2. The outlet of combustion gases is regulated with a flow, not shown, so that a pressure near atmospheric pressure is obtained in the combustion chamber. The sucking off of acid fumes from the collecting vessel is set by means of a fan so that a vacuum is obtained in the collecting vessel. The arrangement described above functions well even in case the seals 16 should not function entirely satisfactorily and because of this combustion gases enter into the collecting vessel and are sucked off from it. In the latter case, the pressure difference prevents acid fumes from entering into the combustion gas space and causing corrosion damage.

When the device is started, the heating should appropriately take place slowly, so that temperature shocks which might lead to thermal rupturing are avoided. In the combustion chamber the working temperature is approx. 900° C., while the temperature in the outlet channel 18 is approx. 500° C.

At the concentration of acids which are heavily contaminated by metal salts, the concentration should not be driven so far that the metal salts are precipitated on the quartz tubes. The last part of the concentration can then take place by conducting heat to the following vessel 2 for the acid. For this last concentration, however, only a small portion of the total quantity of heat is required. As an example of this may be mentioned that 50% suplhuric acid fed in to the quartz tube is concentrated to 90%, after which the final concentration takes place in the collecting vessel to a concentration of 95%. For the concentration of 1000 kg 50% $H_2SO_4$ (60° C.) to 90%, a quantity of heat of approx. 350,000 kcal=1.- 46·$10^6$ kJ is required. For the continued concentration up to 95%, 35,000 kcal=1.5·$10^5$ kJ is required. The last-mentioned quantity of heat can be conducted in for instance through electric heating by means of a heating jacket 2a (FIG. 2a) of the bottom of the collecting vessel. In order to prevent precipitation of the salts then in the collecting vessel, this is connected to a cooler, through which the acid is drained off. In this case, the vessel is also provided with a pipe for conducting off combustion gases to the top of the furnace.

The invention is not limited to the embodiment shown above as an example, but can be subject to modifications within the scope of the following claims.

We claim:

1. Apparatus for supporting an elongated evaporating tube in a system for purifying mineral acids, said apparatus comprising:
   a double-walled tube unit having an outer flow channel for heating gases between its inner and outer walls, said evaporating tube being arranged within said tube unit and spaced therefrom to define an inner flow channel for heating gases between said evaporating tube and said inner wall;
   means connecting said inner and outer flow channels in flow through relationship at the lower portion of said tube unit whereby flow of heating gases in said inner channel is opposite in direction to flow in said outer channel;
   shoulder means extending from the lower end of said evaporating tube and having a spherical exterior contact surface;
   seal means situated about said evaporating tube, against which said spherical contact surface seals;
   a reduced diameter portion formed in the lower end of said evaporating tube below said spherical contact surface said portion extending through said seal means;
   a collection vessel into which said reduced diameter portion extends; and
   means for supporting said evaporating tube against radial movement near its upper end.

2. Apparatus according to claim 1, further comprising means located in said outer flow channel for turbulating heating gases flowing therein.

3. Apparatus according to claim 2, wherein said turbulating means comprises a plurality of guide vanes located at one or in a plurality of places along the longitudinal extent of said tube unit.

4. Apparatus according to claim 3, wherein said guide vanes are attached to said outer wall and extend across from 80 to 90% of the radial distance between said inner and outer walls.

5. Apparatus according to claim 1, wherein said seal means comprises a quartz ring surrounding said evaporating tube beneath said shoulder means, further comprising means extending from said tube unit for supporting said quartz ring and a quartz fiber seal ring resting on said quartz ring, said fiber ring having an oblique surface against which said shoulder means makes contact.

6. Apparatus according to claim 1, wherein said inner wall of said tube unit is supported at its lower end.

7. Apparatus according to claim 1, wherein there are a plurality of said evaporating tubes each having its own tube unit, said plurality being supported as a module by a further plurality of supporting plates which contact the outer walls of said tube units at least at one location along their lengths.

8. Apparatus according to claim 1, wherein said evaporating tube and said tube unit are arranged vertically in a combustion chamber in which heating gases are produced, said seal means forming a seal between said evaporating tube and the interior of said chamber; said apparatus also comprising further seal means situated about said tube unit and said evaporating tube below said supporting means, said further seal means forming a seal separating said chamber from an outlet channel for said heating gases, said tube unit being double-walled from its lower end upward to said chamber, said outer flow channel there being connected in flow through relationship with said chamber.

9. Apparatus according to claim 8, wherein said evaporating tube extends out of the upper end of said tube unit, through said outlet channel and through said supporting means.

10. Apparatus according to claim 8, wherein a suction fan is arranged in said outlet channel for drawing heating gases through said tube unit from said chamber.

11. Apparatus according to claim 8, wherein said tube unit is provided with an external flame guard within said chamber.

12. Apparatus according to claim 1, wherein said evaporating tube has a length of between 3 and 10 meters and an inner diameter of between 100 and 200 millimeters.

13. Apparatus according to claim 12, wherein said evaporating tube is 5 meters in length and 125 millimeters in inner diameter.

14. Apparatus according to claim 1, wherein said evaporating tube is filled with packings of the same or different dimensions, in one or a plurality of layers.

15. Apparatus according to claim 1, wherein said evaporating tube comprises an outer tube, an inner tube and obliquely arranged guide means between said inner and outer tubes for imparting rotating movement to rising gases.

16. Apparatus according to claim 1, wherein said evaporating tube is made from clear quartz.

* * * * *